(12) United States Patent
Joyce

(10) Patent No.: US 8,239,112 B2
(45) Date of Patent: Aug. 7, 2012

(54) PRESSURE, TIRE FORCE AND FRICTION ESTIMATION DURING ANTILOCK CONTROL

(75) Inventor: John Patrick Joyce, West Bloomfield, MI (US)

(73) Assignee: Ford Global Technologies, Dearborn, MI (US)

( * ) Notice: Subject to any disclaimer, the term of this patent is extended or adjusted under 35 U.S.C. 154(b) by 592 days.

(21) Appl. No.: 12/405,401

(22) Filed: Mar. 17, 2009

(65) Prior Publication Data

US 2010/0017088 A1   Jan. 21, 2010

Related U.S. Application Data

(60) Provisional application No. 61/081,099, filed on Jul. 16, 2008.

(51) Int. Cl.
*B60T 7/12* (2006.01)
*G05D 1/00* (2006.01)
*G06F 7/00* (2006.01)
*G06F 17/00* (2006.01)

(52) U.S. Cl. ............ 701/83; 701/70; 701/71; 701/78; 701/80; 701/82; 188/293; 188/361; 303/155; 303/167

(58) Field of Classification Search ............ 701/70, 701/71, 78, 82, 83; 188/85, 141, 151, 152, 188/181, 182, 322.13; 303/11, 61, 138, 155–158, 167, 113.1
See application file for complete search history.

(56) References Cited

U.S. PATENT DOCUMENTS

| | | | | |
|---|---|---|---|---|
| 7,216,939 B2 * | 5/2007 | Obai | | 303/11 |
| 2003/0154012 A1 * | 8/2003 | Anwar | | 701/71 |
| 2006/0255659 A1 * | 11/2006 | Obai | | 303/146 |

* cited by examiner

*Primary Examiner* — Jack W Keith
*Assistant Examiner* — Rami Khatib
(74) *Attorney, Agent, or Firm* — Angela M. Brunetti; Fredrick Owens

(57) ABSTRACT

A method for estimating a brake pressure, a longitudinal tire force and a tire-road μ during periods of antilock control that measures deceleration of a wheel during a period of constant brake pressure, reduces a brake pressure to cause slip on the wheel to begin reducing, measures reacceleration of the wheel after a point in time in which the change in brake pressure is completed, calculates a change in acceleration based on the measured reacceleration and the measured deceleration, estimates a change in brake pressure from a proportional relationship between the change in acceleration and a brake pressure value, estimates a brake pressure from the relationship between a time for valve activation during a change in acceleration and the change in brake pressure. The method also estimates a longitudinal tire force from a mathematical relationship between the change in acceleration, a tire radius, and the estimated brake pressure. The method also estimates tire-road μ by dividing a normal tire force by the estimated longitudinal tire force.

30 Claims, 3 Drawing Sheets

US 8,239,112 B2

PRESSURE, TIRE FORCE AND FRICTION ESTIMATION DURING ANTILOCK CONTROL

CROSS REFERENCE TO RELATED APPLICATIONS

This application claims the benefit of the filing date of U.S. Provisional Patent Application Ser. No. 61/081,099, filed Jul. 16, 2008, entitled "Pressure, Tire Force and Friction Estimation during Antilock Control", the entire disclosure of which is hereby incorporated by reference into the present application.

TECHNICAL FIELD

The inventive subject matter relates generally to vehicle braking and more particularly to estimating brake pressure, tire force and friction during antilock control.

BACKGROUND

Brake pressure estimation is a fundamental basis for modern brake control systems, especially roll stability control and conventional electronic stability control. Originally, antilock brake systems did not typically rely on brake pressure estimation. However, modern algorithms are increasingly relying on it. This is in part due to the fact that the algorithms are available with stability control implementations. Further, using brake pressure estimation to support antilock control can simplify arbitration between requests from competing controllers for antilock, traction and stability control. Some methods of estimating brake pressure use valve times and models of hydraulic components. However, these methods tend to suffer inaccuracies due to variation in components and operating conditions.

A fundamental part of antilock control is tire-road $\mu$ estimation. Tire-road $\mu$, a coefficient of friction, estimation is commonly used to adjust thresholds for control logic (i.e., slip, acceleration), estimate vehicle deceleration for stabilizing reference speed calculations, change modes of control such as for split-$\mu$ control and $\mu$-transition control. Current methods estimate tire-road $\mu$ for a vehicle by observing vehicle deceleration during antilock control. However, these methods require multiple control cycles and are subject to errors when road grades are involved. Further, there is a reduction in accuracy when less than all of the wheels are in antilock control. Additionally, these methods are tuned empirically and lead to distinct state changes in control.

There is a need for a more accurate, more robust brake pressure estimation that is continuous and seamlessly integrated into general vehicle braking control.

SUMMARY

The present invention provides a method for estimating brake pressure, tire force and friction during antilock control comprising the combination of features of the independent claims, preferred optional features being introduced by the dependent claims

Elements and steps in the figures are illustrated for simplicity and clarity and have not necessarily been rendered according to any particular sequence. For example, steps that may be performed concurrently or in different order are illustrated in the figures to help to improve understanding of the embodiments of the inventive subject matter.

DESCRIPTION OF INVENTION

While various aspects of the present invention are described with reference to a particular illustrative embodiment, the invention is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
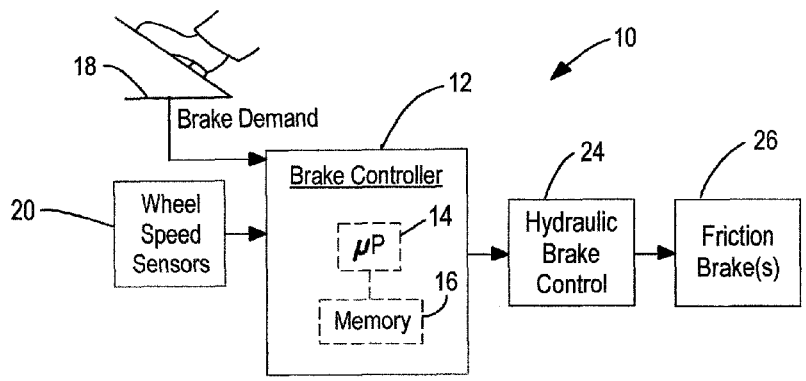
FIG. 1 is an example of a brake system for a vehicle.

Referring to FIG. 1, a brake system 10 is generally shown for a vehicle having hydraulic friction braking. The brake system 10 has controls to determine variation in the brake torque and compensate for such brake torque variation so as to provide for consistent braking feel to a vehicle operator, as well as improved stopping distance. The brake system 10 may also be applied in connection with the combination of regenerative braking, typically employed in electric and hybrid vehicles, but not described herein.

The brake system includes a brake controller 12 for controlling the overall braking operation. The brake controller 12 includes a microprocessor 14 and memory 16 for storing and processing brake control routines. The brake controller 12 receives a brake demand signal from a brake pedal 18 and speed signals from wheel speed sensors 20 associated with various vehicle wheels. A brake pedal 18 is actuated by an operator of the vehicle to demand an amount of braking torque based on the driver applied force. The brake demand signal may include a sensed pressure, typically generated in a master cylinder (not shown), and/or a pedal stroke travel distance indicative of the travel distance of the brake pedal 18. The use of sensed pressure and/or distance is well-known in the vehicle braking art as indications of the amount of braking effort requested by the vehicle operator for controlling braking of a vehicle.

A hydraulic brake control 24, which may include a conventional master cylinder for generating pressurized hydraulic brake fluid using valves, communicates with friction brakes 26 to control the amount of friction braking. Friction brakes 26 are generally configured to provide friction braking to brake a corresponding wheel on the vehicle in response to the hydraulic fluid pressure generated by the hydraulic brake control 24. Each of friction brakes 26 may include other friction braking systems, such as electromechanical brake systems, which do not include hydraulics.

Figure 2:
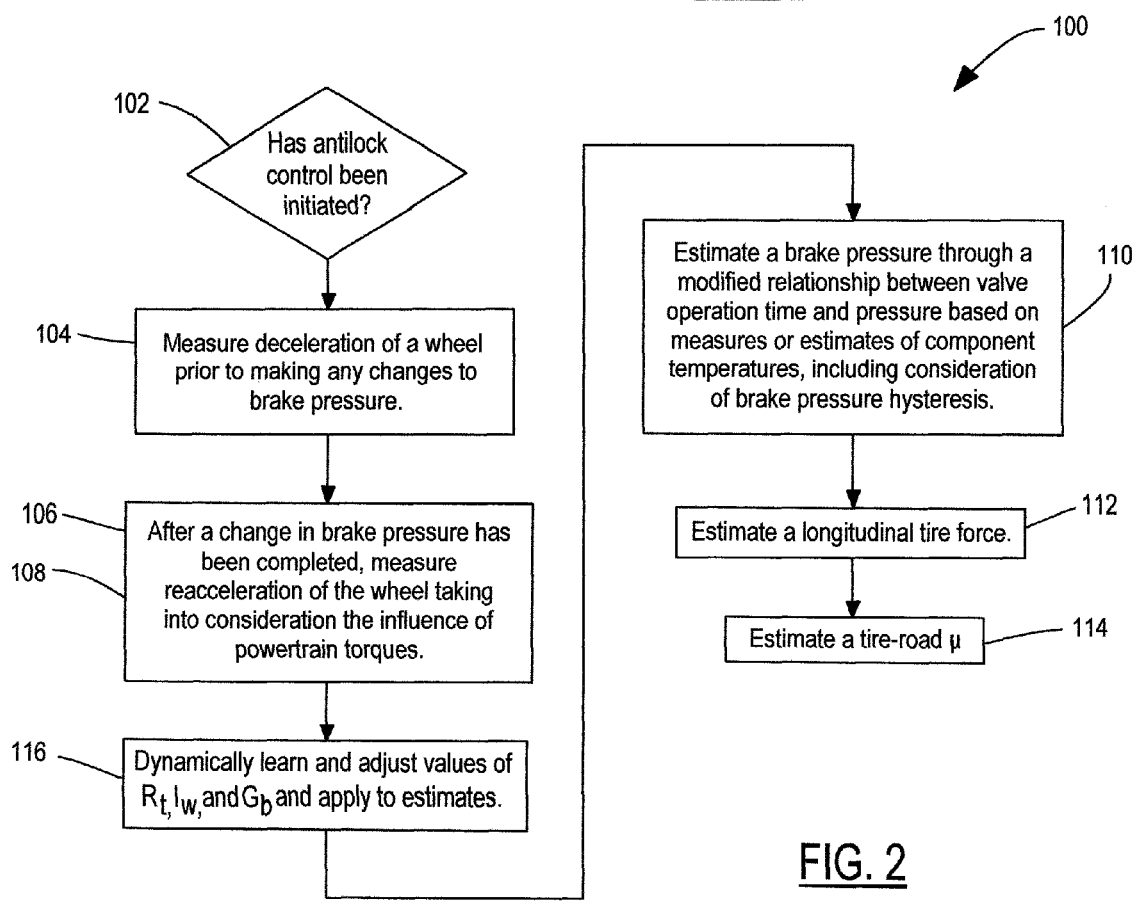
FIG. 2 is a flow diagram illustrating a method of estimating brake pressure, longitudinal tire force, and tire-road $\mu$ according to the inventive subject matter.

The inventive subject matter calculates longitudinal tire force and tire-road $\mu$ from an estimation of brake pressure in a brake during antilock control, thereby effectively enhancing the efficiency of antilock control. The estimations may occur in the brake controller 12. Referring to FIG. 2, a flow diagram of a method 100 is shown. During a period in which brake pressure is held constant and anti-lock control has been initiated 102, the deceleration/slip of a wheel indicates that it is exceeding the available adhesion between the tire and the road. Prior to any change being made in the brake pressure, a deceleration of the wheel is measured 104. Brake pressure is then reduced 106 by an amount sufficient to reduce slip on the wheel by activating a solenoid valve for a predetermined period of time. Typically the wheel is reaccelerating when the slip is being reduced, although this is not necessary if the vehicle is decelerating. After the change in brake pressure is completed, reacceleration of the wheel is measured 108. Using the measured changes in acceleration as they relate to the vehicle dynamics, a determination of brake pressure is made 110, a determination of longitudinal tire force is made 112 and an estimate of tire-road μ is made 114 using the equations discussed hereinafter.

The determination of brake pressure 110 applies an assumption that tire-road μ is approximately the same during the deceleration of the wheel prior to the change in brake pressure and during the reacceleration of the wheel after the change in brake pressure. Therefore, the change in acceleration of the tire/wheel, $A_w$, is directly proportional to the brake torque, $T_b$. The proportional relationship is given by the inertia of the tire/wheel, $I_w$ where:

$$A_{w\_decel} - A_{w\_reaccel} = (T_{b\_decel} - T_{b\_reaccel})/I_w \quad (1)$$

Brake pressure, $P_b$, is approximately proportional to brake torque, $T_b$, where $G_b$ is a constant, typically called a brake gain, that is dependent upon the geometry of the brake and a brake lining friction:

$$T_b = P_b \cdot G_b \quad (2)$$

Therefore, the change in brake pressure, $P_b$, is proportional to the change in acceleration of the wheel:

$$P_{b\_decel} - P_{b\_reaccel} = (A_{w\_decel} - A_{w\_reaccel}) \cdot I_w / G_b \quad (3)$$

In conventional brake controls there is a known relationship between the duration of a valve activation time to decrease pressure, the change in the pressure and the amount of the pressure in the brake. The change in pressure is calculated from Equation (3), and the duration of the valve activation time is known. The amount of pressure in the brake can be determined from the known relationship.

The determination of longitudinal tire force 112 is as follows, given the relationship of tire radius, $R_t$, longitudinal tire force, $F_t$, and brake torque, $T_b$, to tire/wheel acceleration $A_w$ as:

$$I_w \cdot A_w = (F_t \cdot R_t) + T_b \quad (4)$$

Longitudinal tire force, $F_t$, is positive for a tire force that is slowing the vehicle by trying to accelerate a wheel.

Combining Equations (4) and (2) and solving for longitudinal tire force, $F_t$, yields:

$$F_t = (I_w \cdot A_w - P_b \cdot G_b)/R_t \quad (5)$$

Tire-road μ is defined as the normal tire force, F, divided by the longitudinal force.

$$\mu = F/F_t \quad (6)$$

Estimation of the normal tire force is not addressed herein, but there are several methods commonly known in the industry that may be applied.

Enhancements 116 to the estimations may be made by including the influence of powertrain torques on the calculations of tire/wheel acceleration. Further, dynamically adjusted or learned values for tire radius, $R_t$, inertia of the tire/wheel, $I_w$, and the brake gain, $G_b$ may be applied for enhanced estimates 116. For example, from Equation (3), the ratio of the change in pressure to the change in wheel acceleration is proportional to the ratio of the wheel inertia, $I_w$ to the brake gain, $G_b$. By making repeated observations of the wheel acceleration and the corresponding change in pressure over several antilock brake control cycles, the ratio of $I_w$ to $G_b$ can be estimated. By applying some or all of the following constraints, an estimate of both $I_w$ and $G_b$ may be determined: $I_w$ must be close to a known tire or wheel assembly value (for example, a full size tire versus a mini-spare size tire), $G_b$ must be close to a known brake gain value, the total braking produced by $G_b$ values from all wheels and all $R_t$ must be close to the vehicle deceleration, and the value of $I_w$ must be consistent with the value of $R_t$ learned from wheel speed comparisons (for example, if the inertia is low, indicating a mini-spare tire, then the radius learned from comparison with other wheel speeds should also indicate that a mini-spare is installed).

The relationship between valve operation time and pressure may be modified based on measures or estimates of component temperatures. It is well known that as fluid temperature decreases, fluid viscosity increases, causing less fluid to flow for a given duration of valve operation time. If less fluid flows, the resulting change in the brake pressure will be less. A model of the relationship between valve operation time, temperature and the resulting change in brake pressure may enhance the accuracy of estimations.

Furthermore, there is a dependency upon brake lining compressibility and brake lining temperature. As brake lining compressibility increases, more fluid volume must flow to achieve the same pressure reduction. A model of the relationship between valve operation time, lining temperature and the resulting change in brake pressure can enhance the accuracy of the estimations.

Also there is a well known dependency between brake lining temperatures and brake gain, $G_b$. A model of the relationship between $G_b$ and brake lining temperature may be used to improve estimates if an estimate or measure of brake lining temperature is available.

Including the influence of the hysteresis in brake torque vs. brake pressure may further enhance estimates. For example, repeated observations of wheel slip are made. Around the time of high wheel slip occurrence changes in wheel acceleration, $\Delta A$, and corresponding changes in brake pressure, $\Delta P$, are collected.

$$\Delta T = G_b \cdot (\Delta P + P_h) \quad (7)$$

For a pressure decrease, where $\Delta T$ is the change in brake torque, $\Delta P$ is the change in brake pressure, and $P_h$ is the hysteresis in brake pressure, also for a pressure decrease.

$$\Delta T = J_w \cdot \Delta A / R_{dl} \quad (8)$$

This is under the assumption that the torque from the road is the same during wheel deceleration and wheel reacceleration that happen close to each other in time.

Combining equations (7) and (8) yields:

$$J_w \cdot \Delta A / R_{dl} = G_b \cdot (\Delta P + P_h) \quad (9)$$

$$J_w \cdot \Delta A / (R_{dl} \cdot G_b) - (\Delta P + P_h) = 0 \quad (10)$$

By definition;

$$G = J_w / (R_{dl} \cdot G_b) \quad (11)$$

Substituting Equation (11) into Equation (10) simplifies to;

$$G \cdot \Delta A - \Delta P - P_h = 0 \quad (12)$$

Since $\Delta P$ and $\Delta A$ are recorded from multiple observations, G and $P_h$ can be calculated as long as there are two or more observations.

Figure 3:
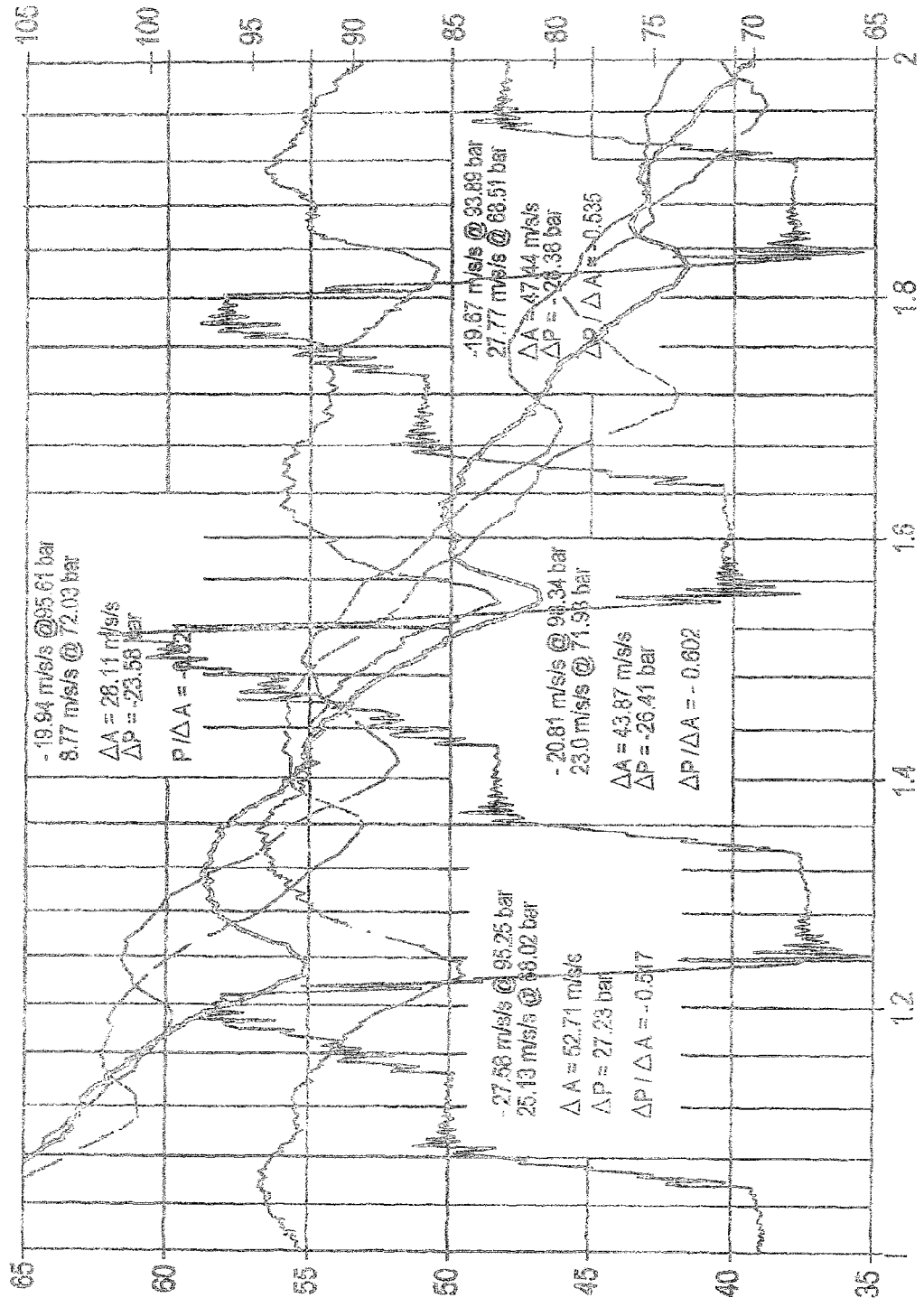
FIG. 3 is a graph of wheel speeds, brake pressure and an estimate of tire slip.

FIG. 3 is a graph of wheel speeds, a brake pressure and an estimate of tire slip. From the data provided in the graph, an estimate of the hysteresis in the brake pressure vs. torque may be made. Large decreases in brake pressure mark the times when measurements of interest are made. Before the large pressure decrease, the wheel acceleration is measured and the brake pressure is averaged. After the large pressure decrease the wheel acceleration is measured and the brake pressure is averaged. It should be noted that the pressure is not changing a lot. At each large pressure decrease, $\Delta A$ and $\Delta P$ are shown in FIG. 3. $\Delta A$ is the change in the wheel acceleration before and after the large pressure decrease. $\Delta P$ is the change in brake pressure before and after the large pressure decrease. The ratio between $\Delta A$ and $\Delta P$ is recorded. As long as the assumption that the tire-road $\mu$ is approximately the same and there is no significant change in the normal force before and after the brake pressure decrease, then Equations (7) through (12) hold true.

If there were no pressure hysteresis, then the ratio between $\Delta P$ and $\Delta A$ would be constant. Referring to Equation (9), if $P_h=0$, then $\Delta P$ and $\Delta A$ would be constant. The same holds true for Equations (11) and (12), with $P_h$ equal to zero. However, in FIG. 3 the ratio values recorded show considerable variation, i.e., 0.517, 0.535, 0.602, and 0.821, implying that $P_h$ is not equal to zero.

Figure 4:
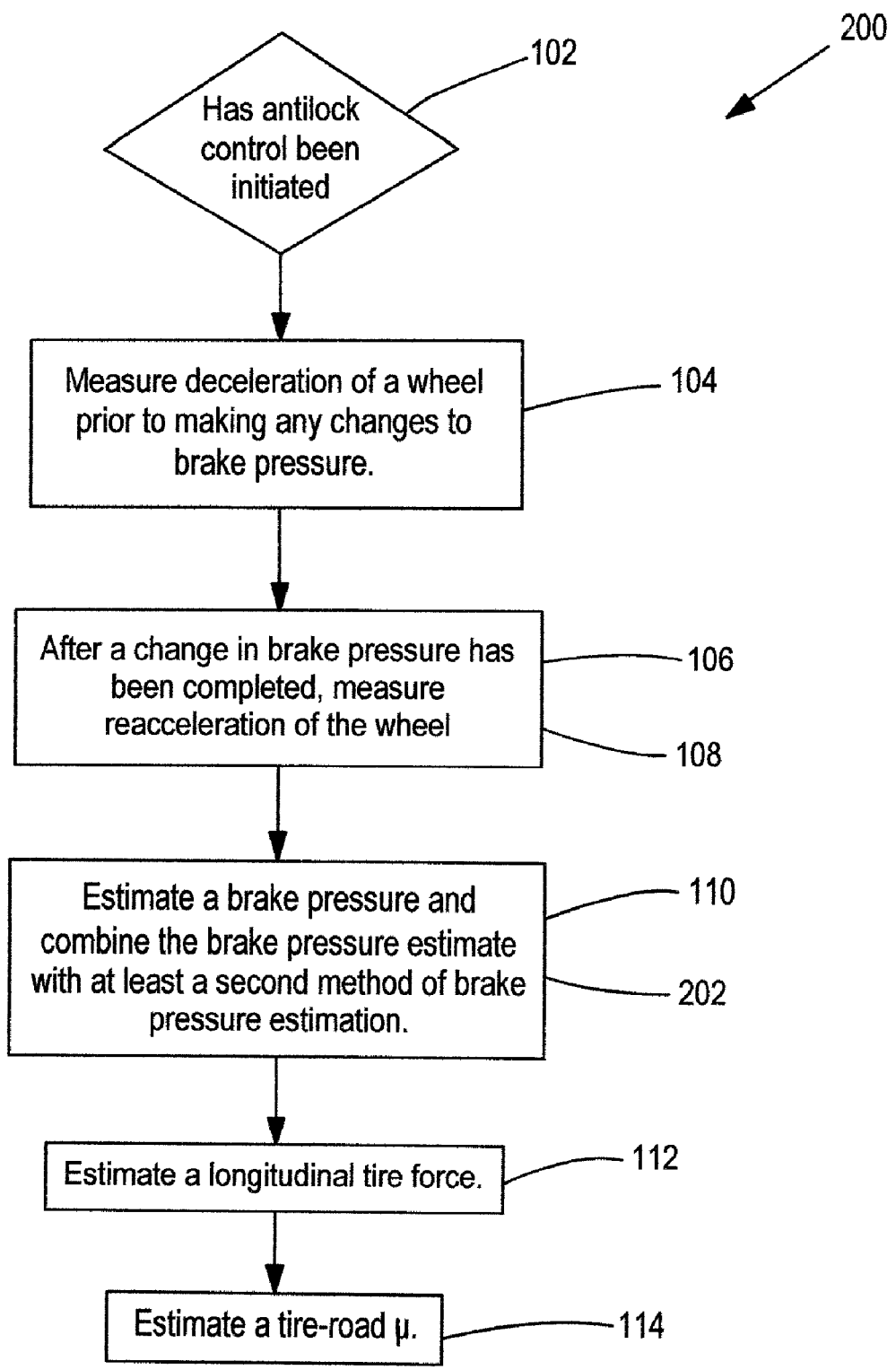
FIG. 4 is flow diagram illustrating a method of estimating brake pressure, longitudinal tire force, and tire-road $\mu$ according to another embodiment of the inventive subject matter.

Estimates may also be enhanced 116 by including the influence of tire compression under load on the tire radius value as shown in FIG. 2. The estimate of the tire radius is independent of the other elements. Thus, the value may be used to improve the estimate of the longitudinal force. Using vehicle deceleration, brake pressure and inertial signals to dynamically adjust estimates for $R_t$, $I_w$, and $G_b$. The brake pressure estimate may be used in conjunction with other conventional methods 202, as shown in FIG. 4, for estimating brake pressure to improve the overall accuracy for brake pressure estimates. Longitudinal tire force and tire-road $\mu$ may be estimated by the equation (4), as presented above, from conventional brake pressure estimates during periods when brake pressure is changing or there are no significant changes in wheel acceleration:

$$I_w \cdot A_w = (F_t \cdot R_t) + T_b \quad (4)$$

The inventive subject matter is advantageous for estimating a general tire-road $\mu$ for a vehicle over observing vehicle deceleration during antilock control for estimating because it can be accomplished much faster. The estimate according to the inventive subject matter may be accomplished in as little as 150 ms as opposed to observing vehicle deceleration, which may take up to 300 ms. According to the inventive subject matter, the estimate is available during the first control cycle on the first wheel in antilock control. Further advantages may include an estimate that is more robust to grades than estimates based on vehicle deceleration. Furthermore, the inventive subject matter has greater accuracy when less than all of the tires are in antilock control.

It should be noted that, in some applications and the method 200 as shown in FIG. 4 a combination of the inventive subject matter and other methods for estimating brake pressure by using valve times and models of hydraulic components will result in an extremely accurate estimate. In this embodiment, at least two estimates are provided during each control cycle 202; one after a pressure increase and once after a pressure decrease. Using at least two estimates helps offset the influence of hysteresis in the torque vs. pressure relationship. Yet another advantage may be realized in that the inventive subject matter is readily applied to systems that do not have conventional brake pressure estimation algorithms used to support stability control.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

While particular embodiments of the invention have been shown and described, numerous variations and alternate embodiments will occur to those skilled in the art. Accordingly it is intended that the invention be limited only in terms of the appended claims.

The invention claimed is:

1. A method for estimating a brake pressure during periods of antilock control, the method comprising the steps of:
   measuring deceleration of a wheel during a period of constant brake pressure;
   reducing a brake pressure to reduce slip on the wheel;
   measuring reacceleration of the wheel after a point in time in which the change in brake pressure is completed;
   calculating a change in acceleration of the wheel based on the measured reacceleration and the measured deceleration;
   determining a time period for valve activation during the change in acceleration;
   calculating a change in brake pressure using the calculated change in acceleration; and
   estimating a brake pressure from the calculated change in brake pressure and the time period for valve activation.

2. The method as claimed in claim 1 further comprising the step of estimating a longitudinal tire force from a mathematical relationship between the change in acceleration, a tire radius, and a brake torque value.

3. The method as claimed in claim 2 further comprising the step of estimating tire-road coefficient of friction, $\mu$, by dividing a normal tire force by the estimated longitudinal tire force.

4. The method as claimed in claim 3 further comprising the steps of:
repeating the estimation of brake pressure, longitudinal tire force and tire-road coefficient of friction, $\mu$; and
averaging the estimates of longitudinal tire force and tire-road i to compensate for errors.

5. The method as claimed in claim 4 wherein the step of calculating a change in acceleration of the wheel further comprises including a dynamically adjusted value for a wheel inertia.

6. The method as claimed in claim 4 wherein the step of calculating a change in acceleration further comprises including a learned value for a wheel inertia.

7. The method as claimed in claim 4 wherein the step of estimating a brake pressure further comprises including a dynamically adjusted value for a brake gain.

8. The method as claimed in claim 4 wherein the step of estimating a brake pressure further comprises including a learned value for a brake gain.

9. The method as claimed in claim 4 wherein the step of estimating a longitudinal tire force further comprises including a dynamically adjusted value for a tire radius.

10. The method as claimed in claim 9 wherein the step of estimating longitudinal tire force further comprises including the influence of tire compression under load in the dynamically adjusted value for a tire radius.

11. The method as claimed in claim 4 wherein the step of estimating a longitudinal tire force further comprises including a learned value for a tire radius.

12. The method as claimed in claim 11 wherein the step of estimating longitudinal tire force further comprises including the influence of tire compression under load in the learned value for a tire radius.

13. The method as claimed in claim 4 wherein the step of estimating a brake pressure further comprises including compensation for the influence of hysteresis in brake torque and brake pressure in the estimate.

14. The method as claimed in claim 13 wherein the step of estimating brake pressure including compensation for the influence of hysteresis further comprises the steps of:
collecting data representative of changes in brake pressure that occur during at least two instances of high wheel slip;
collecting data representative of changes in wheel acceleration that occur during at least two instances of high wheel slip;
applying the assumption that tire road i is approximately constant during the at least two instances of high wheel slip;
applying the assumption that normal force is approximately constant during the at least two instances of high wheel slip; and
calculating gain and hysteresis values using the collected data representative of changes in brake pressure and the collected data representative of changes in wheel acceleration.

15. The method as claimed in claim 1 wherein the step of calculating a change in acceleration further comprises including powertrain torque values.

16. A method for estimating a brake pressure during periods of antilock control, the method comprising the steps of:
measuring deceleration of a wheel during a period of constant brake pressure;
reducing a brake pressure to reduce slip on the wheel;
measuring reacceleration of the wheel after a point in time in which a change in brake pressure is completed;
calculating a change in acceleration of the wheel from the measured reacceleration and the measured deceleration;
timing a valve activation during the change in acceleration to determine a time period for valve activation;
calculating a change in brake pressure from proportional relationship between the change in acceleration and a change in brake pressure; and
estimating a brake pressure from a mathematical model of the calculated change in brake pressure and the time period for valve activation.

17. The method as claimed in claim 16 further comprising the step of estimating a longitudinal force from a mathematical relationship between the change in acceleration, a tire radius, and the estimated brake pressure.

18. The method as claimed in claim 17 further comprising the step of estimating a tire-road coefficient of friction, $\mu$, by dividing a normal tire force by the estimated longitudinal force.

19. The method as claimed in claim 18 further comprising the steps of:
repeating the estimation of brake pressure, longitudinal force and tire-road coefficient of friction, $\mu$; and
averaging the estimates to compensate for errors.

20. The method as claimed in claim 19 wherein the step of calculating a change in acceleration further comprises including powertrain torque values.

21. The method as claimed in claim 19 wherein the step of estimating a brake pressure further comprises including the dynamically adjusted value for a wheel inertia.

22. The method as claimed in claim 19 wherein the step of estimating a brake pressure further comprises including a learned value for a wheel inertia.

23. The method as claimed in claim 19 wherein the step of estimating a brake pressure further comprises including a dynamically adjusted value for a brake gain.

24. The method as claimed in claim 19 wherein the step of estimating a brake pressure further comprises including a learned value for a brake gain.

25. The method as claimed in claim 19 wherein the step of estimating a longitudinal tire force further comprises including a dynamically adjusted value for a tire radius.

26. The method as claimed in claim 19 wherein the step of estimating a longitudinal tire force further comprises including a learned value for a tire radius.

27. A method for estimating a brake pressure during periods of antilock control, the method comprising the steps of:
measuring deceleration of a wheel during a period of constant brake pressure;
reducing a brake pressure to reduce slip on the wheel;
measuring reacceleration of the wheel after a point in time in which a change in brake pressure is completed;
calculating a change in acceleration of the wheel from the measured reacceleration and the measured deceleration;
timing a valve activation during the change in acceleration to determine a time period for valve activation;
calculating a change in brake pressure from proportional relationship between the change in acceleration and a change in brake pressure;
estimating a brake pressure from a mathematical model of the calculated change in brake pressure and the time period for valve activation;
estimating a longitudinal force from a mathematical relationship between the change in acceleration, a tire radius, and the estimated brake pressure; and estimating a tire-road coefficient of friction, $\mu$, by dividing a normal tire force by the estimated longitudinal force.

28. The method as claimed in claim 27 further comprising the steps of:

repeating the estimation of brake pressure, longitudinal force and tire-road coefficient of friction, $\mu$; and averaging the estimates to compensate for errors.

29. The method as claimed in claim 28 wherein the step of estimating a brake pressure further comprises including compensation for the influence of hysteresis in brake torque and brake pressure in the estimate.

30. The method as claimed in claim 29 wherein the step of estimating brake pressure including compensation for the influence of hysteresis further comprises the steps of:

collecting data representative of changes in brake pressure that occur during at least two instances of high wheel slip;

collecting data representative of changes in wheel acceleration that occur during at least two instances of high wheel slip;

applying the assumption that tire road i is approximately constant during the at least two instances of high wheel slip;

applying the assumption that normal force is approximately constant during the at least two instances of high wheel slip; and calculating gain and hysteresis values using the collected data representative of changes in brake pressure and the collected data representative of changes in wheel acceleration.

\* \* \* \* \*